United States Patent
Yang et al.

(10) Patent No.: US 11,330,621 B2
(45) Date of Patent: May 10, 2022

(54) METHOD AND APPARATUS FOR TRANSMITTING UPLINK DATA IN TIME SENSITIVE NETWORK

(71) Applicant: ELECTRONICS AND TELECOMMUNICATIONS RESEARCH INSTITUTE, Daejeon (KR)

(72) Inventors: Mi Jeong Yang, Daejeon (KR); Sung Min Oh, Daejeon (KR); Soon Yong Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 17 days.

(21) Appl. No.: 16/907,497

(22) Filed: Jun. 22, 2020

(65) Prior Publication Data

US 2020/0404697 A1    Dec. 24, 2020

(30) Foreign Application Priority Data

Jun. 21, 2019  (KR) .................. 10-2019-0074456
Jun. 18, 2020  (KR) .................. 10-2020-0074212

(51) Int. Cl.
*H04W 4/00*     (2018.01)
*H04W 72/14*    (2009.01)
*H04W 72/12*    (2009.01)

(52) U.S. Cl.
CPC ....... *H04W 72/14* (2013.01); *H04W 72/1268* (2013.01); *H04W 72/1289* (2013.01)

(58) Field of Classification Search
USPC ................. 370/328, 329, 330, 331
See application file for complete search history.

(56) References Cited

U.S. PATENT DOCUMENTS

| | | |
|---|---|---|
| 2017/0013565 A1* | 1/2017 | Pelletier ............. H04W 52/367 |
| 2019/0014593 A1 | 1/2019 | Park et al. |
| 2019/0053218 A1 | 2/2019 | Kim et al. |
| 2019/0132862 A1 | 5/2019 | Jeon et al. |
| 2019/0149365 A1 | 5/2019 | Chatterjee et al. |
| 2019/0150184 A1 | 5/2019 | Golitschek Edler von Elbwart et al. |
| 2019/0268936 A1 | 8/2019 | Sun et al. |
| 2019/0342895 A1 | 11/2019 | Loehr et al. |

(Continued)

FOREIGN PATENT DOCUMENTS

| | | |
|---|---|---|
| KR | 10-2017-0110069 A | 10/2017 |
| WO | 2017-131389 A1 | 8/2017 |
| WO | 2018-128401 A1 | 7/2018 |

*Primary Examiner* — David Q Nguyen
(74) *Attorney, Agent, or Firm* — LRK Patent Law Firm

(57) ABSTRACT

An operation method of a terminal in a communication system includes receiving an RRC message from a base station, the RRC message including configuration information of a plurality of CGs; transmitting a first signal to the base station through a first CG resource indicated by a first CG among the plurality of CGs; receiving a control message from the base station; and based on a result of receiving the control message, transmitting a second signal to the base station through a second CG resource indicated by an activated second CG among the plurality of CGs, wherein a pattern of the first CG resource is different from a pattern of the second CG resource.

13 Claims, 13 Drawing Sheets

(56) References Cited

U.S. PATENT DOCUMENTS

| | | | |
|---|---|---|---|
| 2019/0342911 A1* | 11/2019 | Talarico | H04W 72/0446 |
| 2020/0359409 A1* | 11/2020 | Karaki | H04W 72/0446 |
| 2021/0153022 A1* | 5/2021 | Ohlsson | H04W 12/106 |
| 2021/0167930 A1* | 6/2021 | Jeon | H04L 5/0094 |
| 2021/0210072 A1* | 7/2021 | Parc | G10L 15/07 |
| 2021/0243777 A1* | 8/2021 | Tsai | H04W 72/1289 |

* cited by examiner

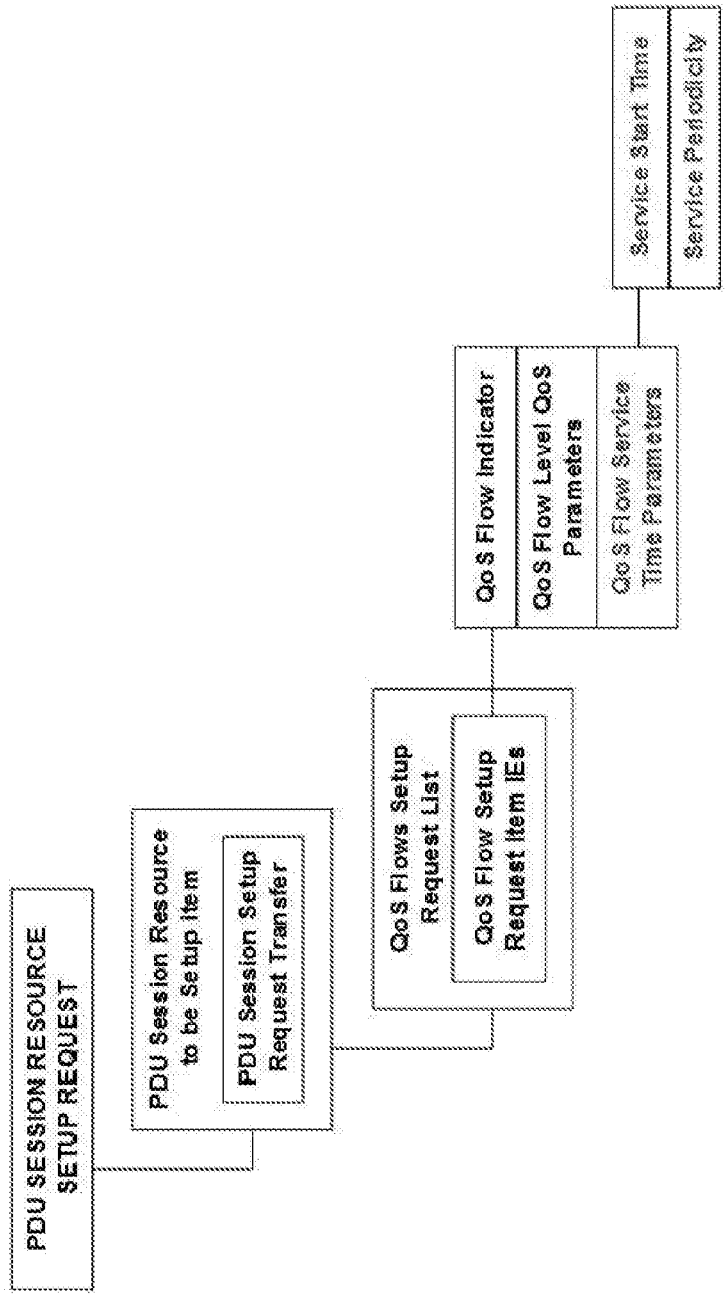

METHOD AND APPARATUS FOR TRANSMITTING UPLINK DATA IN TIME SENSITIVE NETWORK

CROSS-REFERENCE TO RELATED APPLICATIONS

This application claims priority to Korean Patent Applications No. 10-2019-0074456 filed on Jun. 21, 2019, and No. 10-2020-0074212 filed on Jun. 18, 2020 with the Korean Intellectual Property Office (KIPO), the entire contents of which are hereby incorporated by reference.

BACKGROUND

1. Technical Field

The present disclosure relates generally to a method for transmitting data in a mobile communication network, and more specifically, to an operation method of a terminal for transmitting a signal including time sensitive network (TSN) data by changing configuration of a configured grant according to characteristic information of the TSN data.

2. Description of Related Art

After the commercialization of the long-term evolution (LTE), the $3^{rd}$ generation partnership project (3GPP) has been recently discussing frame structures, modulation and coding schemes (MCS) of channels, and multiple access schemes for New Radio (NR), which is a next-generation (e.g., fifth generation (5G)) radio access technology. The NR requires a design that can satisfy various conditions, including improved data rate, improved data processing speed, simultaneous access between multiple devices, and ultra-low latency real-time interworking compared to the LTE/LTE-Advanced. Various communication schemes are being discussed to implement a 5G communication system capable of satisfying such the requirements, and one of them is a communication scheme in which a 5G mobile communication network interworks with a time sensitive network (TSN).

The TSN refers to a network that transmits time-sensitive data (i.e., TSN data) through a wired Ethernet network. The TSN aims to provide deterministic services in the IEEE 802.3 Ethernet network, and aims to guarantee limited and low latency, low packet latency variation, and low packet loss. The TSN standard is applied to various application fields, and is particularly applicable to industrial automation and automotive networks.

The TSN may be applied to a smart factory or the like. A TSN system and a TSN device constituting the TSN can share time reference information through a wired Ethernet network, and transmit and receive TSN data. The TSN system and TSN node constituting the TSN interworking with the 5G mobile communication network can transmit and receive TSN data through the 5G mobile communication network as well as the wired Ethernet network.

It is preferable that the 5G mobile communication network interworking with the TSN minimizes transmission latency in order to transmit the TSN data. For example, according to a smart factory service scenario, it is preferable that an end-to-end (E2E) latency of the 5G mobile communication system is within 0.5 ms. Therefore, in order to minimize the latency in transmission of the TSN data, a scheduling scheme of changing a configured grant based on characteristic information of the TSN data may be required.

SUMMARY

Accordingly, exemplary embodiments of the present disclosure provide a method for transmitting and receiving time sensitive data in a mobile communication network through interworking between the mobile communication network and a time sensitive network (TSN).

According to an exemplary embodiment of the present disclosure, an operation method of a terminal in a communication system may comprise receiving a radio resource control (RRC) message from a base station, the RRC message including configuration information of a plurality of configured grants (CGs); transmitting a first signal to the base station through a first CG resource indicated by a first CG among the plurality of CGs; receiving a control message from the base station; and based on a result of receiving the control message, transmitting a second signal to the base station through a second CG resource indicated by an activated second CG among the plurality of CGs, wherein a pattern of the first CG resource is different from a pattern of the second CG resource.

The pattern of the second CG resource may be a pattern having at least one of a periodicity and a starting time which are different from a periodicity and a starting time of the pattern of the first CG resource.

The RRC message may further include at least one of a periodicity and a starting time of a pattern of each of the plurality of CGs.

The first signal may include time sensitive network (TSN) data generated according to a preconfigured periodicity, and the preconfigured periodicity may be different from a periodicity of each of the plurality of CGs.

Each of the plurality of CGs may be mapped to a data radio bearer (DRB) connected with the base station.

The control message may include at least one of an indicator of the second CG and an indicator of a logical channel mapped to the second CG.

A priority of the logical channel mapped to the second CG may be configured based on configuration information of the second CG, and the second signal may be transmitted through a resource indicated by the second CG activated based on information on the priority of the logical channel.

According to another exemplary embodiment of the present disclosure, an operation method of a terminal in a communication system may comprise receiving a radio resource control (RRC) message from a base station, the RRC message including configuration information of a configured grant (CG) and time domain shift information for a CG resource indicated by the configuration information; transmitting a first signal to the base station through the CG resource; when a latency requirement is not satisfied by using the CG resource, shifting the CG resource in a time domain based on the time domain shift information; and transmitting a second signal to the base station through the shifted CG resource.

The first signal may include time sensitive network (TSN) data generated according to a preconfigured periodicity, and the preconfigured periodicity of the TSN data may be different from a periodicity of the CG.

The CG may be mapped to a data radio bearer (DRB) connected with the base station.

The time domain shift information may include at least one of a time point at which the CG is shifted, a periodicity with which the CG is shifted, and a time by which the CG is shifted in a time domain.

The operation method may further comprise receiving a control message from the base station, wherein in the shifting of the CG resource, the CG is shifted at a time point indicated by the control message.

According to yet another exemplary embodiment of the present disclosure, an operation method of a base station for receiving a signal including data may comprise transmitting a radio resource control (RRC) message to a terminal, the RRC message including configuration information of a configured grant (CG); receiving a first signal from the terminal through a CG resource of the CG; when a latency requirement is not satisfied by using the CG, transmitting a control message to the terminal; and receiving a second signal from the terminal through a CG resource reconfigured based on the control message.

The data may be time sensitive network (TSN) data generated according to a preconfigured periodicity, and the preconfigured periodicity of the TSN data may be different from a periodicity of the CG.

The CG may be mapped to a data radio bearer (DRB) connected with the terminal.

The RRC message may include configuration information of a plurality of CGs indicating different patterns of CG resources, and the first signal may be transmitted through a resource indicated by a first CG among the plurality of CGs.

The reconfigured CG may be a second CG excluding the first CG among the plurality of CGs, and the control message may indicate activation of the second CG.

The control message may include at least one of an indicator of the second CG and an indicator of a logical channel mapped to the second CG.

The RRC message may further include time domain shift information including a time point at which the CG resource is shifted and a time by which the CG is shifted.

The second signal may be transmitted through a resource indicated by the reconfigured CG which is shifted in a time domain based on the time domain shift information.

According to the exemplary embodiments of the TSN data transmission methods of the present disclosure, the mobile communication network allocates radio resources based on characteristic information of received TSN data, thereby transmitting and receiving the TSN data to or from an external TSN system and/or a TSN node with a minimum latency. The terminal using the TSN data transmission methods according to the present disclosure changes configuration of a configured grant based on the characteristic information of the TSN data, thereby preventing transmission latency of the TSN data, and transmitting the TSN data within a certain transmission latency range.

BRIEF DESCRIPTION OF DRAWINGS

Exemplary embodiments of the present disclosure will become more apparent by describing in detail embodiments of the present disclosure with reference to the accompanying drawings, in which:

FIG. 6 is a conceptual diagram illustrating an exemplary embodiment of configuration of a PDU session resource setup request message;

Figure 1:
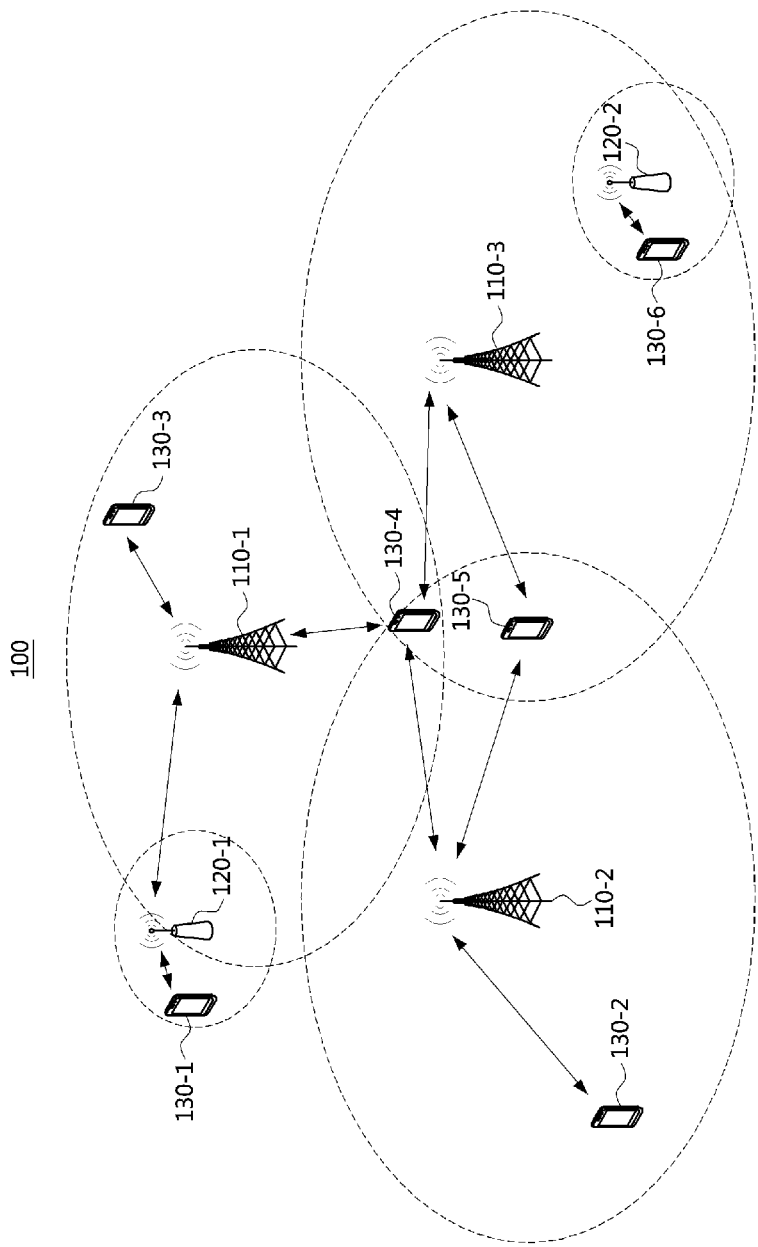
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system 100 may be referred to as a 'communication network'. Each of the plurality of communication nodes may support at least one communication protocol. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, orthogonal frequency division multiple access (OFDMA) based communication protocol, single carrier FDMA (SC-FDMA) based communication protocol, non-orthogonal multiple access (NOMA) based communication protocol, space division multiple access (SDMA) based communication protocol, or the like. Each of the plurality of communication nodes may have the following structure.

Figure 2:
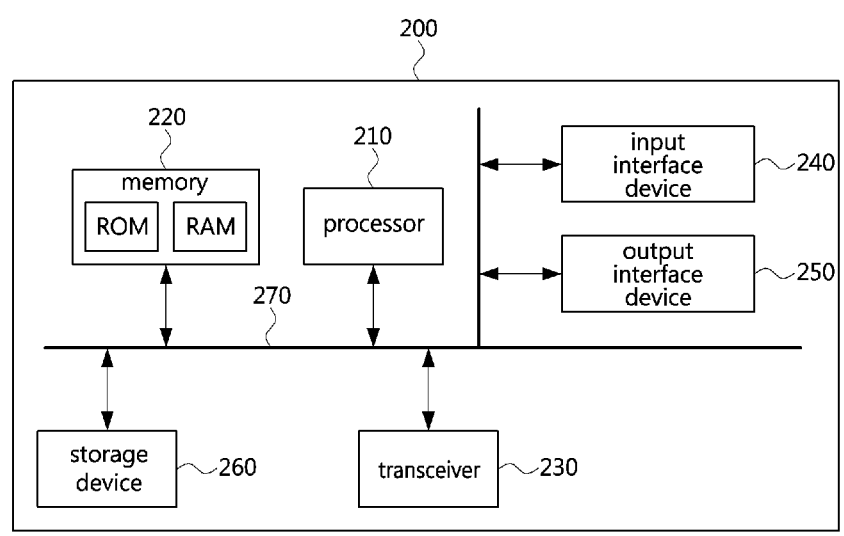
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), base transceiver station (BTS), radio base station, radio transceiver, access point (AP), access node, road side unit (RSU), digital unit (DU), cloud digital unit (CDU), radio remote head (RRH), radio unit (RU), transmission point (TP), transmission and reception point (TRP), relay node, or the like. Each of the plurality of terminals 130-1, 130-2, 130-3, 130-4, 130-5, and 130-6 may be referred to as terminal, access terminal, mobile terminal, station, subscriber station, mobile station, portable subscriber station, node, device, or the like.

Each of the plurality of communication nodes 110-1, 110-2, 110-3, 120-1, 120-2, 130-1, 130-2, 130-3, 130-4, 130-5, and 130-6 may support cellular communication (e.g., long term evolution (LTE), LTE-Advanced (LTE-A), etc., which are defined in the 3rd generation partnership project (3GPP) specification). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink transmission, and may support SC-FDMA-based uplink transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multi-point (CoMP) transmission, a carrier aggregation (CA) transmission, a transmission in unlicensed band, a device-to-device (D2D) communication (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and the operations supported by the plurality of base stations 110-1, 110-2, 110-3, 120-1, and 120-2.

Figure 3:
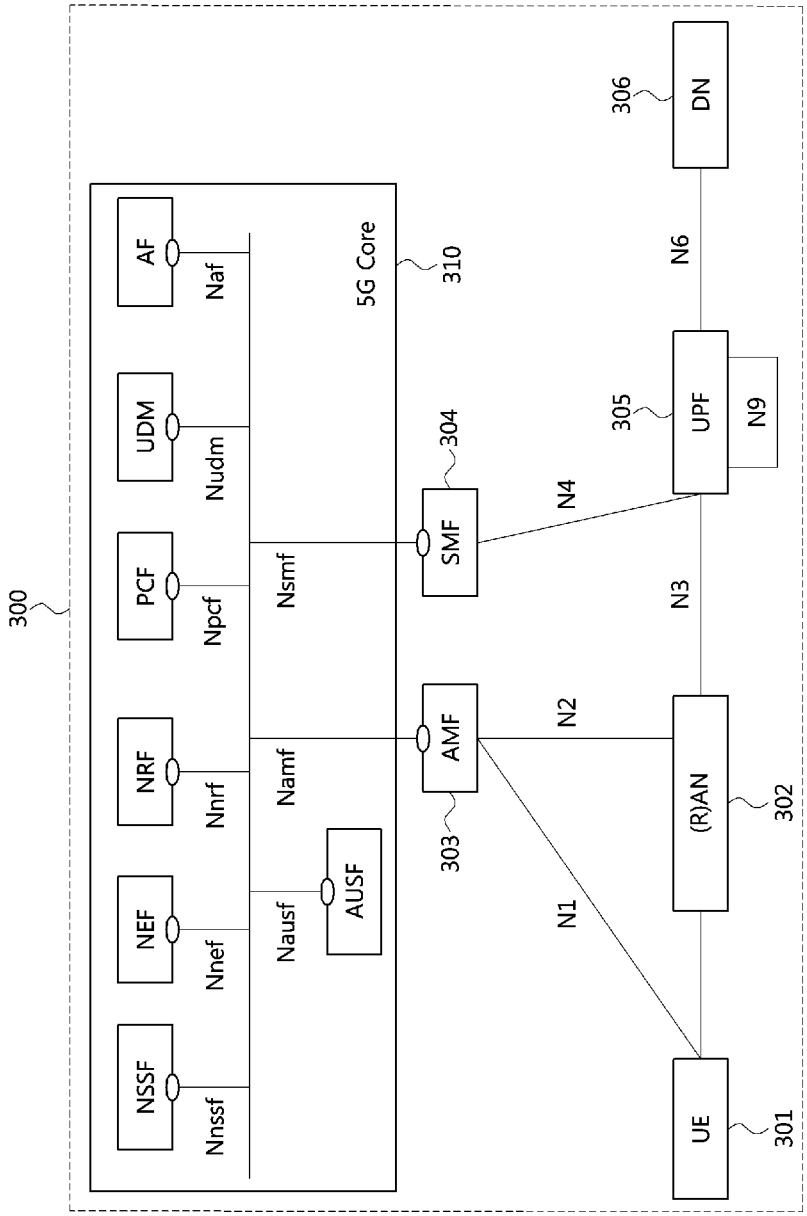
FIG. 3 is a block diagram illustrating an exemplary embodiment of a communication network structure including a core network.

FIG. 3 is a block diagram illustrating an exemplary embodiment of a communication network structure including a core network.

Referring to FIG. 3, a 5G core network 310 may include an application function (AF), access and mobility management function (AMF), authentication server function (AUSF), network exposure function (NEF), network repository function (NRF), network slice selection function (NSSF), policy control function (PCF), session management function (SMF), unified data management (UDM), user plane function (UPF), and the like. Referring to FIG. 3, the structure of the 5G core network 310 may be a structure in which an AMF 303 and an SMF 304 are separated from the 5G core network 310.

The AMF 303 may manage location information and mobility information of a UE 301. The AMF 303 may be connected to the UE 301 through an N1 reference point, and may be connected to a base station (i.e., radio access network ((R)AN) 302) through an N2 reference point. In addition, the AMF 303 may transfer the location information and mobility information of the UE 301 received from the base station 302 and the UE 301 to the 5G core network 310 through an Namf service-based interface connected with the 5G core network 310.

The SMF 304 may process a function of managing a protocol data unit (PDU) session, such as establishing, changing, and releasing a PDU session connected between the UE 301 and the base station 302 and the 5G core network 310. The SMF 304 may be connected to the 5G core network 310 through an Nsmf service-based interface, and may be connected to an UPF 305 through an N4 reference point.

The UPF 305 may transmit data from the UE 301 to a data network (DN) 306. Specifically, the UPF 305 may be connected to the SMF 304 through the N4 reference point, and may approve a session connection request from the SMF 304, and establish a session between the UE 301 and the 5G core network 310.

The 5G core network 310 may include a plurality of service-based interfaces. Referring to FIG. 3, the 5G core network 310 may include service-based interfaces such as Namf, Nsmf, Nnef, Npcf, Nudm, Naf, Nnrf, and Nnssf. The Namf may be a service-based interface provided by the AMF. The Nsmf may be a service-based interface provided by the SMF. The Nnef may be a service-based interface provided by the NEF. The Npcf may be a service-based interface provided by the PCF. The Nudm may be a service-based interface provided by the UDM. The Naf may be a service-based interface provided by the AF. The Nnrf may be a service-based interface provided by the NRF. The Nnssf may be a service-based interface provided by the NSSF. The Nausf may be a service-based interface provided by the AUSF.

Figure 4:
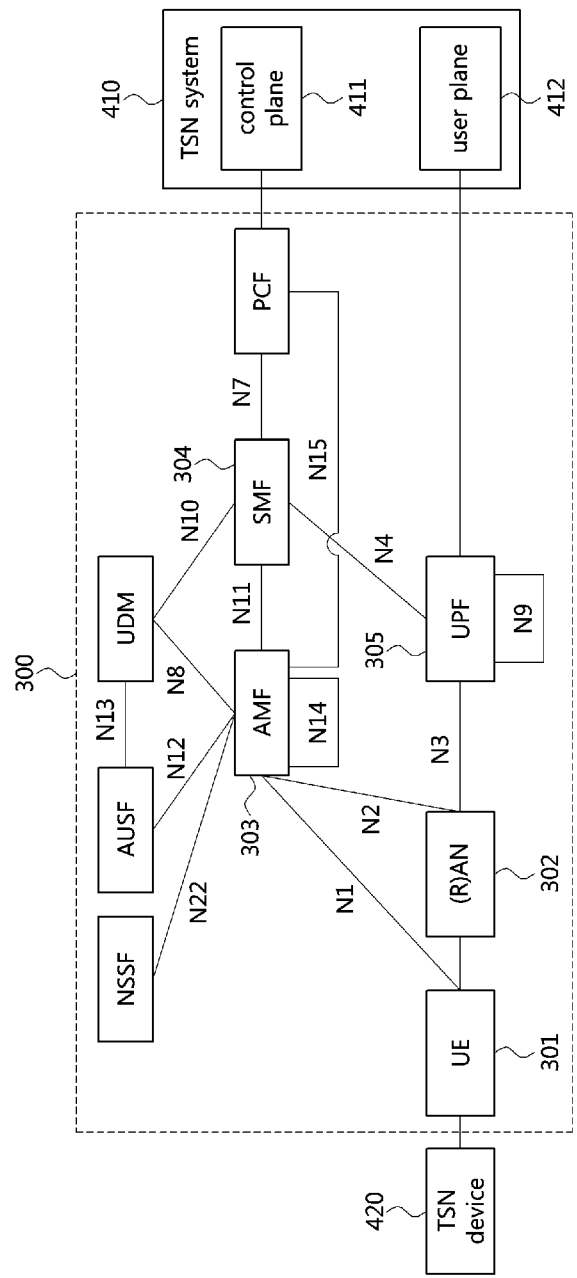
FIG. 4 is a block diagram illustrating an exemplary embodiment of a communication network structure including a 5G core network and a TSN.

FIG. 4 is a block diagram illustrating an exemplary embodiment of a communication network structure including a 5G core network and a TSN.

Referring to FIG. 4, the mobile communication network 300 including the UE 301, the base station 302, and the 5G core network 310 may be connected to a time sensitive network (TSN). The TSN may be a network between nodes that transmit and receive time-sensitive data (i.e., TSN Data). The TSN may include a plurality of TSN nodes 410 and 420, and may include a TSN system 410 and a TSN device 420 as shown in FIG. 4.

The TSN system may include a control plane 411 and a user plane 412. The control plane 411 may manage control information for transmitting and receiving TSN data. The control plane 411 may be connected to the PCF of the 5G core network 310, and may transfer control information for transmitting TSN data through an interface with the PCF. The user plane 412 may manage TSN data. The user plane 412 may be connected to the UPF 305 of the 5G core network, and may transmit TSN data through an interface with the UPF 305.

In general, the TSN device 420 may receive downlink TSN data from the TSN system 410 through a wired Ethernet network, or transmit uplink TSN data to the TSN system 410. According to an exemplary embodiment of the present disclosure, the TSN device 420 may transmit and receive TSN data using the mobile communication network 300. Referring to FIG. 4, the TSN device 420 may be connected to the UE 301 of the mobile communication network 300. The TSN device 420 may receive downlink TSN data from the UE 301 of the mobile communication network 300 or transmit uplink TSN data to the TSN system 410 through the UE 301 of the mobile communication network 300.

Figure 5A:
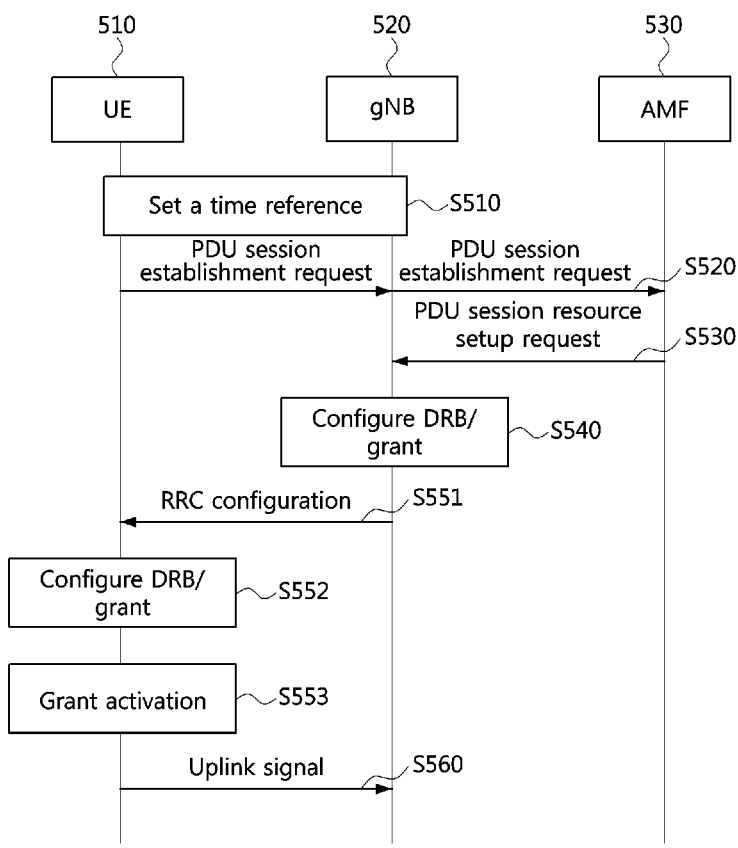
FIG. 5A is a sequence chart illustrating a first exemplary embodiments of an operation method of a communication node transmitting TSN uplink data.
Figure 5B:
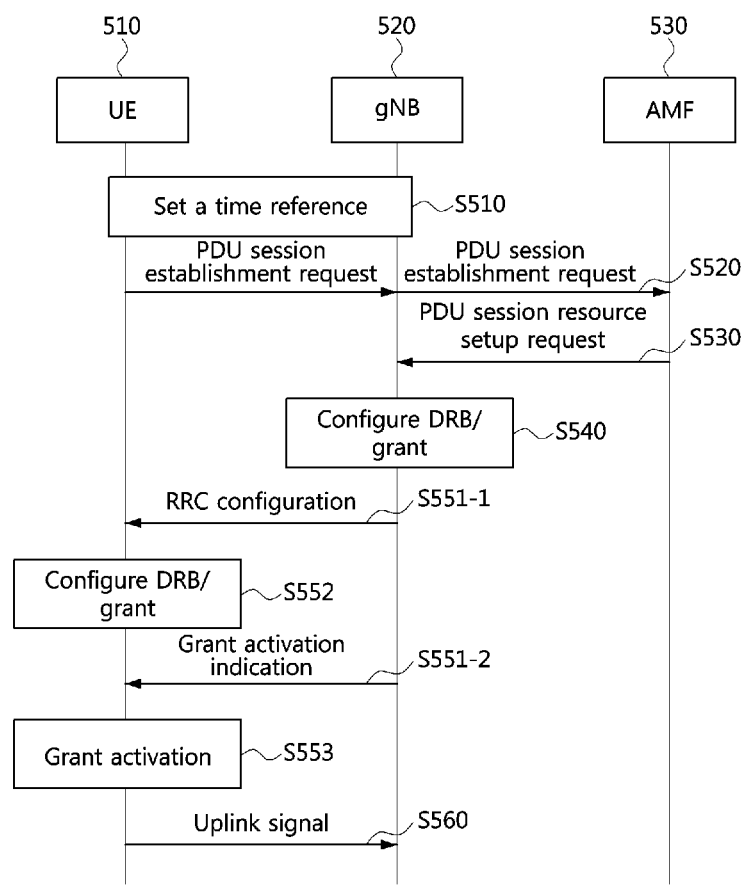
FIG. 5B is a sequence chart illustrating a second exemplary embodiments of an operation method of a communication node transmitting TSN uplink data.

FIGS. 5A and 5B are sequence charts illustrating exemplary embodiments of an operation method of a communication node transmitting TSN uplink data.

Referring to FIGS. 5A and 5B, a mobile communication network including a UE 510, a gNB 520, and an AMF 530 of a 5G core network may be connected to a TSN. The TSN may be a network between nodes that transmit and receive TSN data, i.e., time-sensitive data.

The UE 510 may set a time reference by exchanging time reference information with the gNB 520 (S510). Specifically, the UE 510 may set the time reference through a system information block (SIB) 6 or dedicated signaling (S510). The UE 510 may set the time reference using a current SIB6 according to the 3GPP technical specification (S510).

The UE 510 desiring to transmit TSN data may request a PDU session establishment for transmission of the TSN data (i.e., PDU SESSION ESTABLISHMENT REQUEST) (S520). Specifically, the UE 510 may transmit a PDU session establishment request message to the AMF 530 through the gNB 520 (S520).

The AMF 530 may receive the PDU session establishment request message from the UE 510 through the gNB 520 (S520). The AMF 530 may request a PDU session resource setup from the gNB 520 to establish a new PDU session (S530). A PDU session resource setup request message transmitted by the AMF 530 may include information described below.

FIG. 6 is a conceptual diagram illustrating an exemplary embodiment of configuration of a PDU session resource setup request message.

Referring to FIG. 6, the PDU session resource setup request message may include QoS flows setup request information. The QoS flows setup request information may include a QoS flow indicator (QFI), QoS flow level information, and QoS parameters. In addition, the QoS flow setup request information may further include time parameters of a QoS flow service. The time parameters of the QoS flow service may be time parameters of TSN traffic. Specifically, the time parameters of the QoS flow service may further include service starting time information of the TSN traffic and service periodicity information of the TSN traffic.

Referring again to FIGS. 5A and 5B, the gNB 520 may receive the PDU session resource setup request message from the AMF 530 (S530). Upon receiving the PDU session resource setup request message, the gNB 520 may configure an ultra-reliable low-latency communication (URLLC) data radio bearer (DRB) for transmitting TSN traffic (S540). The gNB 520 that configures the URLLC DRB for the TSN data transmission may configure a logical channel to be assigned to the URLLC DRB. The gNB 520 may configure UL-specific parameters of the logical channel to be assigned to the URLLC DRB. Configuration information of the logical channel including the UL-specific parameters may be as described below.

Figure 7:
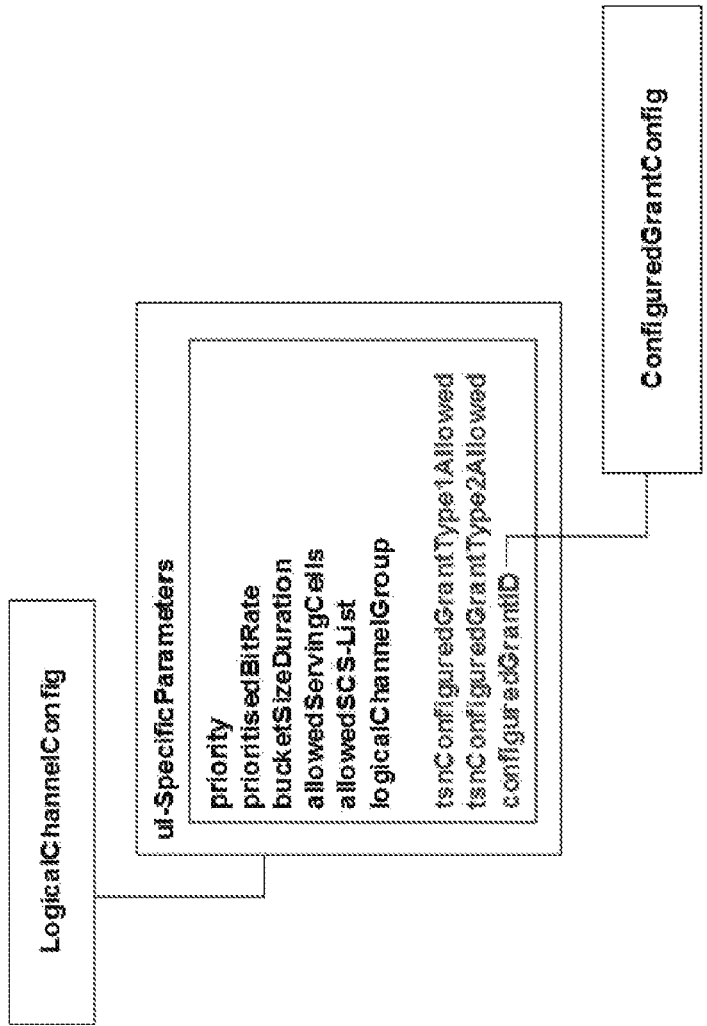
FIG. 7 is a conceptual diagram illustrating a first exemplary embodiment of logical channel configuration information.

FIG. 7 is a conceptual diagram illustrating a first exemplary embodiment of logical channel configuration information.

Referring to FIG. 7, the gNB 520 may configure characteristic information of logical channels. The characteristic information of the logical channels may include priority information, prioritized bit rate (PBR) information, bucket size duration (BSD) information, allowed serving cell information, allowed subcarrier spacing (SCS) list information, logical channel group information, and/or the like for the logical channels.

Also, the characteristic information of the logical channels may further include type information of a configured grant. For example, the characteristic information of the logical channel may further include information indicating a first type of an activation scheme for the configured grant (i.e., tsnConfiguredGrantType1Allowed) and information indicating a second type of an activation scheme for the configured grant (i.e., tsnConfiguredGrantType2Allowed). The type information of the configured grant may be reflected when determining a logical channel priority for transmitting UL data of the UE 510.

The characteristic information of the logical channels may include an identifier (ID) of the configured grant, and may further include configuration information of the configured grant. The gNB 520 may configure a configured grant for each of the DRBs. The gNB 520 may configure a grant for the DRB by reflecting the time parameters of the QoS flow service. That is, the gNB 520 may configure a grant for the DRB by reflecting the service starting time information and the service periodicity information among the time parameters of the QoS flow service, which are received from the AMF 530. For example, the gNB 520 that configures the configured grant may determine the periodicity of the configured grant based on the service periodicity information. In addition, the gNB 520 that configures the configured grant may determine an activation time of the configured grant based on the service starting time information.

Referring again to FIGS. 5A and 5B, the gNB 520 may generate an RRC message including DRB configuration information and logical channel configuration information (S540). The RRC message may be an RRC connection configuration message and/or an RRC connection reconfiguration message. The gNB 520 may transmit the RRC message to the UE 510 (S551).

The UE 510 may receive the RRC message including the DRB configuration information and the logical channel configuration information from the gNB 520 (S551). The UE 510 may configure a configured grant for each DRB based on the received RRC message (S552). The UE 510 may activate the configured grant according to the type of the configured grant (S553). The operation of the UE 510 for configuring and activating the configured grant according to the type of the configured grant may be as follows.

Configuration/Activation of a Configured Grant for a URLLC DRB (First Type)

Referring to FIG. 5A, the UE 510 receiving the RRC message from the gNB 520 may configure a URLLC DRB with the gNB 520 (S552). In addition, the UE 510 may activate a configured grant of the URLLC DRB according to the 3GPP technical specification (S553). The UE 510 may activate the configured grant for each DRB using time domain offset information (i.e., timeDomainOffSet) and time domain allocation information (i.e., timeDomainAllocation) included in the configured grant information (S553).

Configuration/Activation of a Configured Grant for a URLLC DRB (Second Type)

Referring to FIG. 5B, the UE 510 receiving the RRC message from the gNB 520 may configure a URLLC DRB with the gNB 520 (S552). The gNB 520 may transmit a control message indicating activation of the configured grant to the UE (S551-2). The control message indicating activation of the configured grant, which is transmitted by the gNB 520, may be at least one of an RRC message, a MAC message, and a PHY message. The MAC message may include a MAC control element (CE). Also, the PHY message may include DCI. The UE 510 may receive the control message indicating activation of the configured grant from the gNB 520 (S551-2).

The DCI of the control message indicating activation of the configured grant may be scrambled by a CS-RNTI, and may include a logical channel indicator. Alternatively, the DCI of the control message indicating the activation of the configured grant may include a configured grant indicator. At least a portion of fields of the DCI of the control message may include a logical channel indicator or a configured grant indicator. According to an exemplary embodiment of the present disclosure, an exemplary embodiment of a structure of the DCI of the control message indicating one configured grant per DRB may be as shown in Table 1 and Table 2 below.

TABLE 1

|  | DCI format 0_0 |
| --- | --- |
| HARQ process number | '0's |
| Redundancy version | '00' |
| MCS | '0's |
| Resource block assignment | '0's |
| Time domain resource assignment field | Logical channel indicator/Configured grant indicator |
| Frequency hopping flag | |

TABLE 2

|  | DCI format 1_0 |
| --- | --- |
| HARQ process number | '0's |
| Redundancy version | '00' |
| MCS | '0's |
| Resource block assignment | '0's |
| Time domain resource | Logical channel |

TABLE 2-continued

| DCI format 1_0 | |
|---|---|
| assignment field VRB-to-PRB mapping | indicator/Configured grant indicator |

According to Tables 1 and 2, the DCI may include a HARQ process number field, a redundancy version field, a modulation and coding scheme (MCS) field, and a resource block assignment field. The HARQ process number field, redundancy version field, MCS field, and resource block assignment field of the DCI may be set to '0' or '00', respectively.

In addition, according to the exemplary embodiment of Table 1, the DCI may further include a time domain resource assignment field and a frequency hopping flag field. The time domain resource assignment field and the frequency hopping flag field of the DCI may indicate a logical channel or a configured grant. That is, the time domain resource assignment field and the frequency hopping flag field of the DCI may include a logical channel indicator or a configured grant indicator.

In addition, according to the exemplary embodiment of Table 2, the DCI may further include a time domain resource assignment field and a VRB-to-PRB mapping field. The time domain resource assignment field and the VRB-to-PRB mapping field of the DCI may indicate a logical channel or a configured grant. That is, the time domain resource assignment field and the VRB-to-PRB mapping field of the DCI may include a logical channel indicator or a configured grant indicator.

The UE 510 that has scheduled the configured grant for each DRB may configure a logical channel. When the RRC message includes the allowed SCS list information, the UE 510 may set an SCS index included in the allowed SCS list as an SCS index of the UL configured grant. When the RRC message includes the allowed serving cell information, the UE 510 may set a serving cell of the UL configured grant based on cell information included in the allowed serving cell information. In addition, when the RRC message includes maximum duration information (i.e., maxPUSCH-Duration) of a PUSCH, the UE 510 may set a duration within the maximum duration value to the duration of the UL configured grant.

The UE 510 may determine a logical channel based on the priority information of the logical channels. The UE 510 may set priorities of the logical channels according to a preconfigured condition. The UE 510 that sets the priorities of the logical channels may give a high priority to a logical channel of a DRB for transmitting TSN data. The priority given by the UE 510 may be as follows.

1. Data from a C-RNTI MAC CE and/or a UL-common control channel (UL-CCCH)
2. MAC CE for confirmation of the configured grant
3. Data from a logical channel (LoCH) for which tsnConnfiguredGrantType1Allowed or tsnConnfiguredGrantType2Allowed is set to TRUE
4. BSR MAC CE excluding a padded BSR
5. Single entry PHR MAC CE and/or multi-entry PHR MAC CE
6. Data from a LoCH except a UL-CCCH
7. Padded BSR MAC CE After determining the logical channel, the UE 510 may allocate resources for transmitting uplink data. For example, as a result of selecting the logical channel, if the tsnConfiguredGrantType1Allowed and tsnConfiguredGrantType2Allowed of the logical channel are set to TRUE, the UE 510 may allocate resources for TSN data. On the other hand, as the result of selecting the logical channel, if the tsnConfiguredGrantType1Allowed and tsnConfiguredGrantType2Allowed of the logical channel are set to FALSE, the UE 510 may not transmit TSN traffic. Therefore, the UE 510 may allocate resources according to the existing NR technical specification. The UE 510 may transmit an uplink signal including TSN data to the gNB 520 through a resource indicated by the configured grant (S560).

Figure 8:
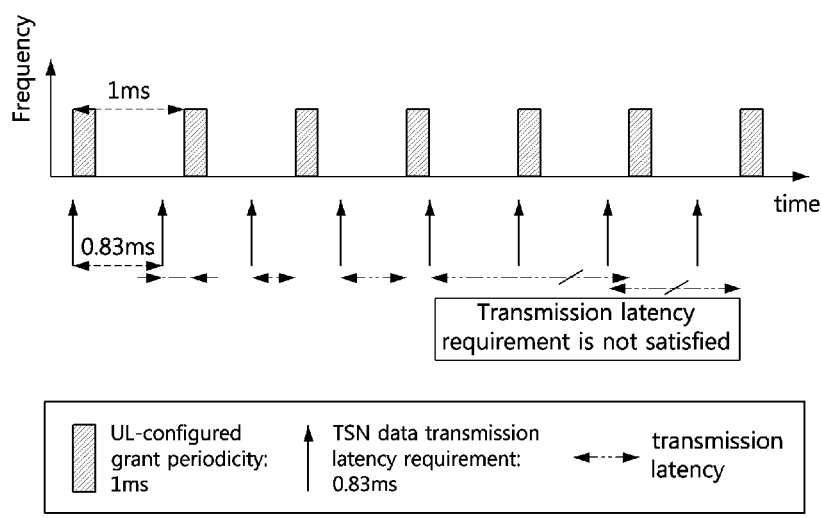
FIG. 8 is a conceptual diagram illustrating a first exemplary embodiment of TSN uplink signal transmission through an uplink grant.

FIG. 8 is a conceptual diagram illustrating a first exemplary embodiment of TSN uplink signal transmission through an uplink grant.

Referring to FIG. 8, the UE 510 may transmit an uplink signal including TSN data to the gNB 520 according to resources indicated by the configured grant. The data transmission periodicity of TSN traffic may be configured depending on a specific application. For example, a data packet of a smart grid including the TSN may occur at 1200 Hz, and the TSN data transmission periodicity may be set to about 0.833 ms. However, the transmission periodicity of the TSN data may not coincide with the configured grant periodicity. For example, the periodicity of the configured grant may be 1 ms. That is, the UE 510 may transmit TSN data to the gNB 520 every 1 ms.

Specifically, the UE 510 may transmit first TSN data through a resource indicated by the configured grant. The UE 510 may obtain second TSN data after 0.83 ms from the time when the first TSN data is transmitted. However, a grant may not be configured after 0.83 ms from the time when the first TSN data is transmitted. The UE 510 may configure a grant 1 ms after the first TSN data is transmitted, and may transmit the second TSN data to the gNB 520 through a resource indicated by the configured grant. That is, as transmission of the TSN data is accumulated, the transmission latency may increase by a certain value (e.g., 0.17 ms). Therefore, as the transmission latency increases, the UE 510 may not satisfy the transmission latency requirement of TSN traffic. In order to resolve such the mismatch between the transmission periodicity of TSN data and the configured grant periodicity, the gNB 520 may configure the DRB as described below.

Figure 9:
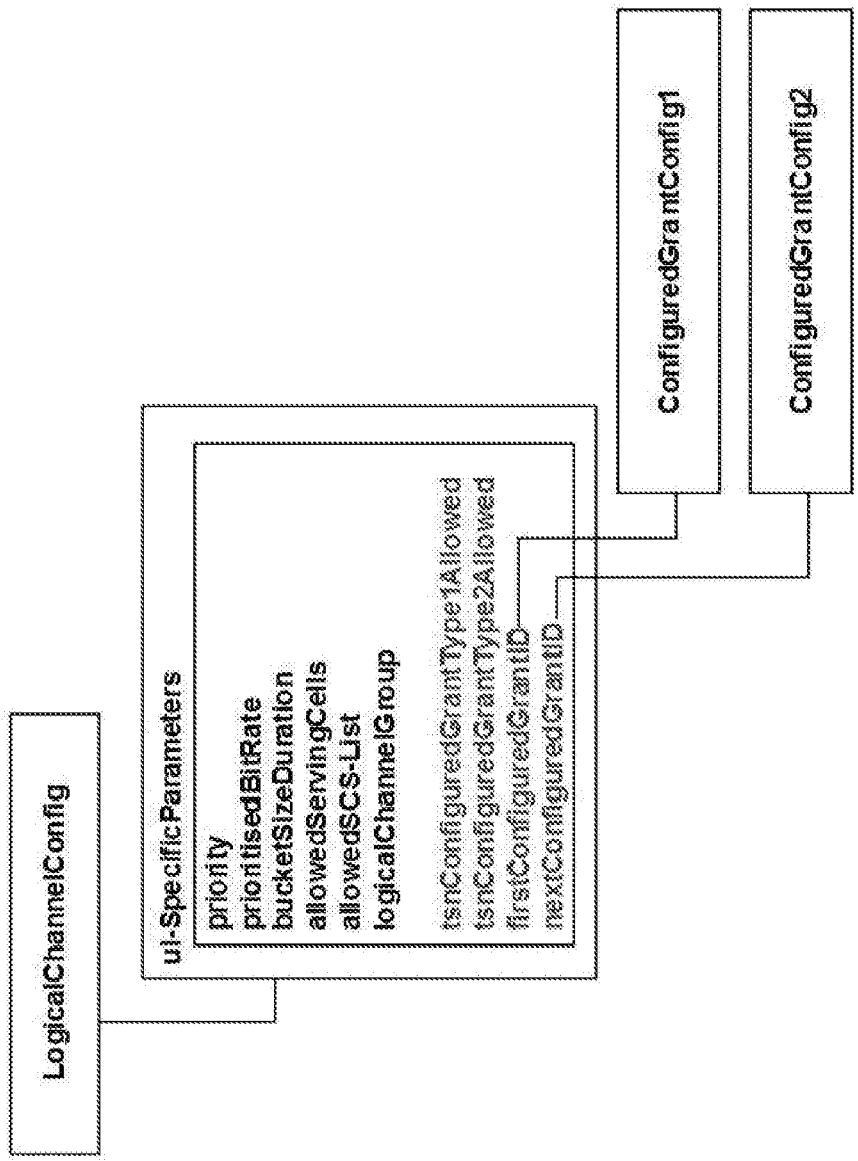
FIG. 9 is a conceptual diagram illustrating a second exemplary embodiment of logical channel configuration information.

FIG. 9 is a conceptual diagram illustrating a second exemplary embodiment of logical channel configuration information.

Referring to FIG. 9, the gNB 520 may configure characteristic information of logical channels. The characteristic information of the logical channels may include priority information, PBR information, BSD information, allowed serving cell information, allowed SCS list information, logical channel group information, and/or the like for the logical channels.

The characteristic information of the logical channels may include IDs of a plurality of configured grants, and may further include configuration information of the plurality of configured grants. Specifically, the characteristic information of the logical channels may include information on the plurality of configured grant. The gNB 520 may configure a configured grant for each of DRBs.

The gNB 520 may generate an RRC message (e.g., RRC connection configuration message and/or RRC connection reconfiguration message) indicating a first grant, which is a first configured grant to be activated. In addition, the gNB 520 may indicate a second grant, which is a configured grant activated after the activation time of the first configured grant, through a control message (e.g., a PHY message including DCI and/or a MAC message including a MAC- CE). Also, information of a plurality of configured grants mapped to the same DRB may be configured differently by reflecting TSN characteristics that change over time. The gNB 520 configuring the type 2 configured grant may resolve the mismatch between the transmission periodicity of the TSN data and the configured grant periodicity through a scheme of configuring a plurality of configured grants for a DRB. The operation of the gNB 520 and the UE 510 to solve the periodicity mismatch problem between the TSN data and the configured grant by mapping two configured grants to the DRB may be as described below.

Figure 10:
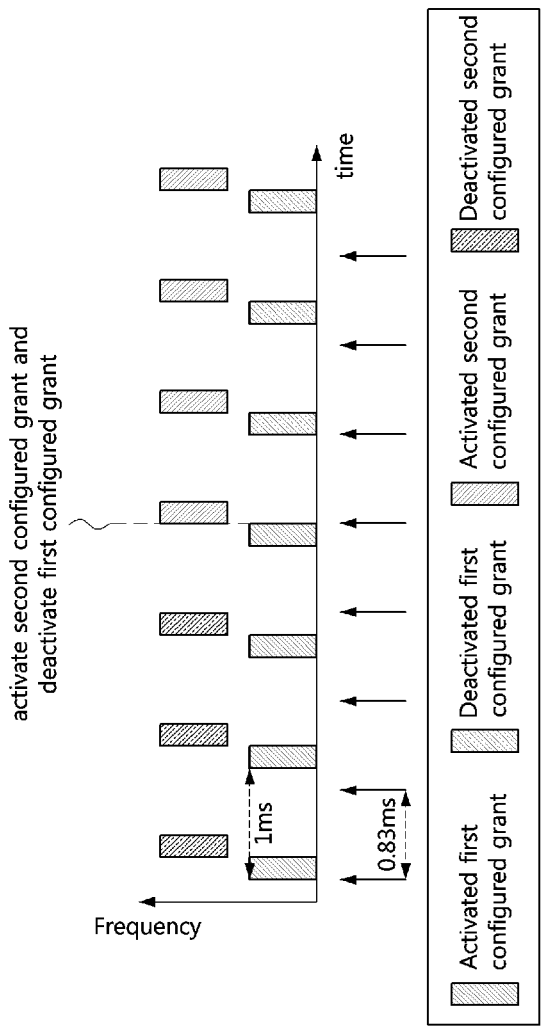
FIG. 10 is a conceptual diagram illustrating a second exemplary embodiment of TSN uplink signal transmission through an uplink grant.

FIG. 10 is a conceptual diagram illustrating a second exemplary embodiment of TSN uplink signal transmission through an uplink grant.

Referring to FIG. 10, the gNB 520 may designate a configured grant that is activated first among configured grants mapped to a URLLC DRB. The gNB 520 may transmit an RRC configuration message (or grant activation indication message) indicating the first activated configured grant to the UE 510. Upon receiving the RRC configuration message (or grant activation indication message), the UE 510 may activate the first configured grant, which is the configured grant indicated by firstConfiguredGrantID. The UE 510 may transmit TSN data to the gNB 520 through a resource indicated by the first configured grant.

As the transmission of TSN data is accumulated through the first configured grant, the transmission latency may increase by a certain value (e.g., 0.17 ms). Since the transmission latency increases, the UE 510 may not satisfy the transmission latency requirement of TSN traffic.

In transmitting uplink data by the first configured grant, if the latency of the uplink data exceeds a preconfigured range, the gNB 520 may activate a second configured grant. The gNB 520 may transmit a control message indicating activation of the second configured grant to the UE 510. The control message may be at least one of an RRC message, a MAC message, and a PHY message. The MAC message may include a MAC CE, and the PHY message may include DCI. The DCI of the PHY message may be scrambled by a CS-RNTI, and may include a logical channel indicator. Alternatively, the DCI of the PHY message may include a configured grant indicator. At least a portion of fields of the DCI of the control message may include a logical channel indicator or a configured grant indicator. According to an exemplary embodiment of the present disclosure, the DCI of the control message that activates the second configured grant may include a structure of Table 3 and/or Table 4.

TABLE 3

| | DCI format 0_0 |
|---|---|
| HARQ process number | '0's |
| Redundancy version | '00' |
| MCS | '0's |
| Resource block assignment | '0's |
| Time domain resource assignment field | Logical channel indicator |
| Frequency hopping flag | |
| TPC command for scheduled PUSCH | Configured grant indicator |

TABLE 4

| | DCI format 1_0 |
|---|---|
| HARQ process number | '0's |
| Redundancy version | '00' |
| MCS | '0's |
| Resource block assignment | '0's |

TABLE 4-continued

| | DCI format 1_0 |
|---|---|
| Time domain resource assignment field | Logical channel indicator |
| VRB-to-PRB mapping | |
| DAI | Configured grant indicator |

According to Tables 3 and 4, the DCI may include a HARQ process number field, a redundancy version field, a modulation and coding scheme (MCS) field, and a resource block assignment field. The HARQ process number field, redundancy version field, MCS field, and resource block assignment field of the DCI may be set to '0' or '00', respectively.

In addition, according to the exemplary embodiment of Table 3, the DCI may further include a time domain resource assignment field and a frequency hopping flag field. The time domain resource assignment field and the frequency hopping flag field of the DCI may indicate a logical channel. In addition, the DCI may further include a TPC command field for a scheduled PUSCH. The TPC command field for a scheduled PUSCH may further include an indicator of a configured grant to be activated.

In addition, according to the exemplary embodiment of Table 4, the DCI may further include a time domain resource assignment field and a VRB-to-PRB mapping field. The time domain resource assignment field and the VRB-to-PRB mapping field of the DCI may indicate a logical channel. In addition, the DCI may further include a downlink assignment index (DAI) field. The DAI may further include an indicator of a configured grant to be activated.

Upon receiving the DCI (or MAC-CE), the UE 510 may activate the second configured grant, which is the configured grant indicated by the DCI. The UE 510 may activate the second configured grant indicated by the DCI of the gNB 520, and may deactivate the previously activated first configured grant. That is, there may be only one configured grant activated for each DRB.

The UE 510 may transmit fifth TSN data through a resource indicated by the second configured grant. The UE 510 may transmit sixth to eighth TSN data through the second configured grant, and may activate the first configured grant and deactivate the second configured grant to transmit subsequent TSN data. Therefore, the UE 510 can flexibly use the configured grants of different characteristics according to the TSN characteristics that change over time, and can resolve the problem of mismatch between the TSN periodicity and the UL grant periodicity.

Figure 11:
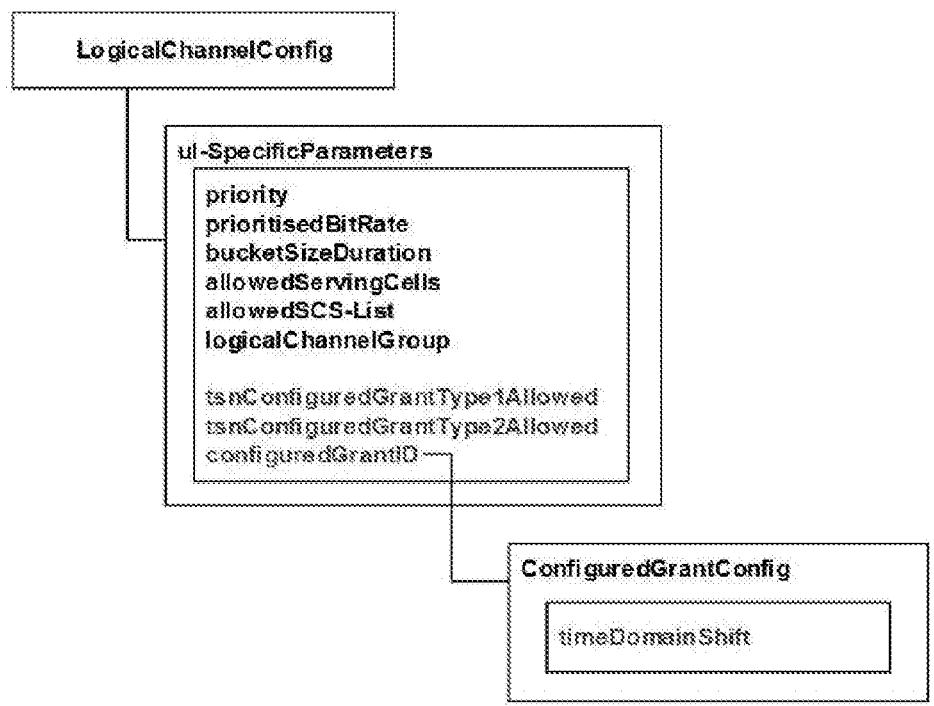
FIG. 11 is a conceptual diagram illustrating a third exemplary embodiment of logical channel configuration information.

FIG. 11 is a conceptual diagram illustrating a third exemplary embodiment of logical channel configuration information.

Referring to FIG. 11, the gNB 520 may configure characteristic information of logical channels. The characteristic information of the logical channels may include priority information, PBR information, BSD information, allowed serving cell information, allowed SCS list information, logical channel group information, and/or the like for the logical channels. In addition, the characteristic information of the logical channels may further include information regarding the type of the configured grant activation scheme (e.g., the first type and/or the second type).

The characteristic information of the logical channels may include the ID of the configured grant, and may further include configuration information of the configured grant. The configuration information of the configured grant may further include time domain shift information. The time domain shift information may indicate at which point in the time domain the configured grant is to be shifted. Also, the time domain shift information may indicate how much to shift the configured grant in the time domain.

The gNB 520 may configure a configured grant for each of DRBs. The gNB 520 may configure a configured grant for the DRB by reflecting the time parameters of the QoS flow service. That is, the gNB 520 may configure a configured grant for the DRB by reflecting service starting time information and service periodicity information among QoS flow service time parameters received from the AMF 530. For example, the gNB 520 that configures the configured grant may determine the periodicity of the configured grant based on the service periodicity information. In addition, the gNB 520 that configures the configured grant may determine an activation time of the configured grant based on the service starting time information.

The operation of the gNB 520 and the UE 510 to solve the problem of periodicity mismatch between the TSN data and the configured grant using the configured grant configuration information including the time domain shift information may be as described below.

Figure 12:
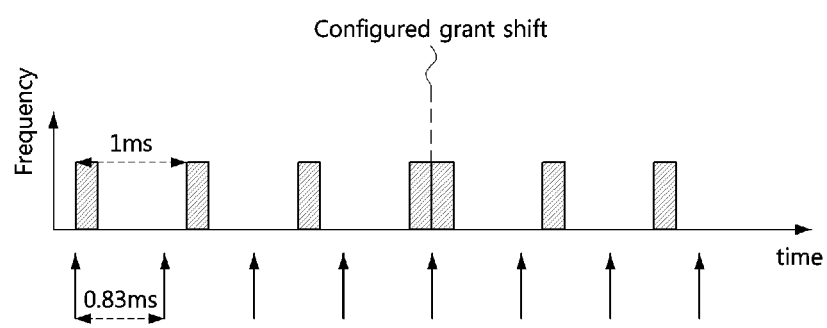
FIG. 12 is a conceptual diagram illustrating a third exemplary embodiment of TSN uplink signal transmission through an uplink grant.

FIG. 12 is a conceptual diagram illustrating a third exemplary embodiment of TSN uplink signal transmission through an uplink grant.

Referring to FIG. 12, the UE 510 may transmit first to fourth TSN data to the gNB 520 through resources indicated by a first configured grant. As the transmission of TSN data is accumulated through the resources indicated by the first configured grant, the transmission latency may increase by a certain value (e.g., 0.17 ms). Since the transmission latency increases, the UE 510 may not satisfy the transmission latency requirement of TSN traffic.

In transmitting uplink data through the resources indicated by the first configured grant, when the latency of the uplink data exceeds a preconfigured range, the UE 510 may shift the first configured grant based on the time domain shift information of the configured grant configuration information. The time domain shift information of the configured grant configuration information may indicate when to shift the currently active configured grant in the time domain. The UE 510 may shift the time resource of the configured grant based on the time domain shift information. That is, the UE 510 may shift the time resource of the configured grant at the time point indicated by the time domain shift information. The time domain shift information of the configured grant may further include information on how much to shift the configured grant in the time domain.

The UE 510 may transmit fifth TSN data through a resource indicated by the shifted first configured grant. The UE 510 may transmit sixth to eighth TSN data through resources indicated by the shifted first configured grant, and may shift the first configured grant again to transmit subsequent TSN data. Accordingly, the terminal may transmit TSN data to the gNB 520 by automatically changing the configured grant based on the time domain shift information.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving a radio resource control (RRC) message from a base station, the RRC message including configuration information of a plurality of configured grants (CGs);
   transmitting a first signal to the base station through a first CG resource indicated by a first CG among the plurality of CGs;
   receiving a control message indicating activation of second CG among the plurality of CGs from the base station; and
   based on a result of receiving the control message, transmitting a second signal to the base station through a second CG resource indicated by the second CG activated by the control message,
   wherein a pattern of the first CG resource is different from a pattern of the second CG resource, and the plurality of CGs are mapped to same data radio bearer (DRB) connected with the base station.

2. The operation method according to claim 1, wherein the pattern of the second CG resource is a pattern having at least one of a periodicity and a starting time which are different from a periodicity and a starting time of the pattern of the first CG resource.

3. The operation method according to claim 2, wherein the RRC message further includes at least one of a periodicity and a starting time of a pattern of each of the plurality of CGs.

4. The operation method according to claim 1, wherein the first signal includes time sensitive network (TSN) data generated according to a preconfigured periodicity, and the preconfigured periodicity is different from a periodicity of each of the plurality of CGs.

5. The operation method according to claim 1, wherein the control message includes at least one of an indicator of the second CG and an indicator of a logical channel mapped to the second CG.

6. The operation method according to claim 5, wherein a priority of the logical channel mapped to the second CG is configured based on configuration information of the second CG, and the second signal is transmitted through a resource indicated by the second CG activated based on information on the priority of the logical channel.

7. An operation method of a base station for receiving a signal including data, the operation method comprising:
   transmitting a radio resource control (RRC) message to a terminal, the RRC message including configuration information of a configured grant (CG);
   receiving a first signal from the terminal through a CG resource of the CG;

when a latency requirement is not satisfied by using the CG, transmitting a control message to the terminal; and receiving a second signal from the terminal through a CG resource reconfigured based on the control message, wherein the CG is mapped to a data radio bearer (DRB) connected with the terminal.

8. The operation method according to claim 7, wherein the data is time sensitive network (TSN) data generated according to a preconfigured periodicity, and the preconfigured periodicity of the TSN data is different from a periodicity of the CG.

9. The operation method according to claim 7, wherein the RRC message includes configuration information of a plurality of CGs indicating different patterns of CG resources, and the first signal is transmitted through a resource indicated by a first CG among the plurality of CGs.

10. The operation method according to claim 9, wherein the reconfigured CG is a second CG excluding the first CG among the plurality of CGs, and the control message indicates activation of the second CG.

11. The operation method according to claim 10, wherein the control message includes at least one of an indicator of the second CG and an indicator of a logical channel mapped to the second CG.

12. The operation method according to claim 7, wherein the RRC message further includes time domain shift information including a time point at which the CG resource is shifted and a time by which the CG is shifted.

13. The operation method according to claim 12, wherein the second signal is transmitted through a resource indicated by the reconfigured CG which is shifted in a time domain based on the time domain shift information.

* * * * *